US010348841B1

(12) United States Patent
Nierenberg

(10) Patent No.: US 10,348,841 B1
(45) Date of Patent: Jul. 9, 2019

(54) SYSTEM AND METHOD FOR EVENT BASED COMMUNICATIONS BETWEEN A MOBILE APPLICATION AND A SERVER

(71) Applicant: Nicolas Nierenberg, La Jolla, CA (US)

(72) Inventor: Nicolas Nierenberg, La Jolla, CA (US)

( * ) Notice: Subject to any disclaimer, the term of this patent is extended or adjusted under 35 U.S.C. 154(b) by 258 days.

(21) Appl. No.: 15/283,354

(22) Filed: Oct. 1, 2016

(51) Int. Cl.
H04W 4/02 (2018.01)
H04W 4/50 (2018.01)
H04L 12/26 (2006.01)
H04L 29/06 (2006.01)
H04L 29/08 (2006.01)
H04W 4/021 (2018.01)

(52) U.S. Cl.
CPC ............ H04L 67/18 (2013.01); H04L 43/106 (2013.01); H04L 67/42 (2013.01); H04W 4/021 (2013.01); H04W 4/025 (2013.01); H04W 4/50 (2018.02)

(58) Field of Classification Search
USPC ........................................ 709/205
See application file for complete search history.

(56) References Cited

U.S. PATENT DOCUMENTS

| 7,948,502 | B2 | 5/2011 | Stanton | |
|---|---|---|---|---|
| 8,248,503 | B2 | 8/2012 | Sogoh et al. | |
| 8,606,294 | B2 | 12/2013 | Alizadeh-Shabdiz | |
| 8,849,819 | B2 | 9/2014 | Johnson | |
| 8,929,921 | B2 | 1/2015 | Gum et al. | |
| 2012/0278387 | A1* | 11/2012 | Garcia | G06Q 50/01 709/204 |
| 2014/0052787 | A1* | 2/2014 | Pigeon | H04L 67/22 709/204 |
| 2014/0205155 | A1* | 7/2014 | Chung | G06K 9/00362 382/115 |
| 2015/0120406 | A1* | 4/2015 | Ekberg | G06Q 30/0252 705/14.5 |

* cited by examiner

Primary Examiner — Hermon Asres
(74) Attorney, Agent, or Firm — Clause Eight IPS; Michael Catania

(57) ABSTRACT

A system and method for event-based communications between a mobile application and a server is disclosed herein. The system comprises a server, a database and mobile communication devices. Users define an event that takes place within a specific geographic region and during a certain period of time. The users either define the event as public, which means that anyone who is present at the location and during that time can participate, or private which means that individuals need authorization to participate.

12 Claims, 7 Drawing Sheets

SYSTEM AND METHOD FOR EVENT BASED COMMUNICATIONS BETWEEN A MOBILE APPLICATION AND A SERVER

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

Field of the Invention

The present invention generally relates to event related wireless communications from a native application of a mobile communication device to a server.

Description of the Related Art

There are many ways to form electronic groups for the purposes of having a discussion, sharing information, and sharing media such as pictures and videos. Groups can be formed simply by creating an email with the members in the address line, or they can be formed on social media platforms such as Google Hangouts, or Facebook. In addition, media and discussions can be shared on an ad hoc basis by sending a message, or email with the media attached. Or a group of people can agree on something like a DropBox folder where they will put media to share. All of these methods have strengths and weaknesses. But none of the current methods has the idea of location and time as the fundamental definition of group. Yet in many cases this is the natural way that a physical group is defined. For example, people at a party are at a particular location for a specific period of time. Other related examples are people at a public event like a concert, or a public location like a beach. With the nature of the gathering correctly modeled in how the groups are defined on a social network platform it will be much easier and more natural to share discussions and media related to the physical gathering.

One reference is Stanton, U.S. Pat. No. 7,948,502 for a Method Of Displaying Picture Having Location Data And Apparatus Thereof, which discloses displaying location data on a map with pictures as thumbnails on the map.

Another reference is Sogoh et al., U.S. Pat. No. 8,248,503 for an Electronic Apparatus And Electronic Camera That Enables Display Of A Photographing Location On A Map Image, which discloses a camera that adds location data to photographs taken by the camera.

Yet another is Johnson, U.S. Pat. No. 8,849,819, for a System And Method For Controlling And Organizing Metadata Associated With On-Line Content, which discloses organizing metadata of on-line content.

Another is Gum et al., U.S. Pat. No. 8,929,921 for Tagging Images With A GPS-Enabled Camera, which discloses a camera that tags images with a GPS coordinate.

Yet another example is Alizadeh-Shabdiz, U.S. Pat. No. 8,606,294 for a Method of and System for Estimating Temporal Demographics of Mobile Users, which discloses a method of estimating demographic information associated with a selected geographical area including, for at least one individual, determining a selected geographical area along a portion of a track of travel of the individual and determining demographic information associated with the at least one individual.

General definitions for terms utilized in the pertinent art are set forth below.

APP is a software application for a mobile phone such as a smart phone.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

BLUETOOTH technology is a standard short range radio link that operates in the unlicensed 2.4 gigaHertz band.

Code Division Multiple Access ("CDMA") is a spread spectrum communication system used in second generation and third generation cellular networks, and is described in U.S. Pat. No. 4,901,307.

FTP or File Transfer Protocol is a protocol for moving files over the Internet from one computer to another.

Global Positioning System (GPS) is a satellite based positioning system.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to the network interface by the manufacturer.

Organizationally Unique Identifier (OUI) is a 24-bit number that uniquely identifies a vendor, manufacturer, or organization on a worldwide basis. The OUI is used to help distinguish both physical devices and software, such as a network protocol, that belong to one entity from those that belong to another.

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

Wireless AP (access point) is a node on the wireless local area network (WLAN) that allows wireless devices to connect to a wired network using Wi-Fi, or related standards.

There is a need for controlling and organizing the sharing of images and communications for a specific event.

BRIEF SUMMARY OF THE INVENTION

The present invention allows users to define an event that takes place within a specific geographic region and during a certain period of time. The users either define the event as public, which means that anyone who is present at the location and during that time can participate, or private which means that individuals need authorization to participate (in addition to being physically present).

In the case of public events created by others, users are able to discover that the public events exist by searching a list of nearby events on a mobile application, or referring to a map on the mobile application where they are plotted. Users are able to join the events, which means the users participate in discussions, and access and share media such as photos and videos. However, the event organizer still has the ability to limit participation to users who are physically at the event, and to media which is, for example, geotagged, and time and date stamped as being within the geographic and temporal confines of the event. The user's location is determined, for example, by a mobile application running on a smart phone. The event organizer determines whether users who are not physically present are allowed to participate in an event and at what level of participation.

In the case of private events created by others, users discover them by electronic invitation, or by being informed in some other manner. In one implementation, the system provides a passcode that can be shared with individuals at the event and the users join the event if they are physically present (as verified by GPS, cellular triangulation or the like) and have entered the code. In another implementation, members of events who have been invited by the event organizer are able to invite other individuals. These are, of course, just examples and there are many ways in which an individual could discover a private event and be authorized to participate. A primary novelty of the present invention is the ability to limit participation by geography and time.

Sharing during an event is either done on an ad-hoc basis where the users select photos or videos to contribute (subject to them being at the right location and time etc.), or it is automatic where users choose to have all the photos and videos that they take with their mobile device during the event shared.

Users have the ability to download photos taken by others, share them on social media, comment on them, or anything else that can be done with photos.

One aspect of the present invention is a system for event-based communications between a mobile application and a server. The system comprises a server, a database and a plurality of mobile communication devices. Each of the plurality of mobile communication devices comprises a mobile application residing in a memory, a processor, a GPS component, WiFi transceiver, a time mechanism, a cellular network communication component, a camera, and a display. An event file is established in the database for a specific event at a predetermined period of time and geographical location. Each image loaded on the mobile application of each of the mobile communication devices is transmitted to the event file at the database if the image comprises a geo-location marker within the geographical location for the specific event and a time stamp within the predetermined period of time. The mobile application of each of the mobile communication devices is capable of accessing the event file at the database for the specific event to search a plurality of loaded images for the specific event and engage in event communications if the mobile communication device is within the geographical location for the specific event and within the predetermined period of time.

Another aspect of the present invention is a method for an event based communications between a mobile application and a server. The method includes establishing an event file in a database for a specific event at a predetermined period of time and geographical location. The method also includes loading an image on a mobile application of a mobile communication device, wherein the mobile communication device comprises the mobile application residing in a memory, a GPS component, WiFi transceiver, a time mechanism, a cellular network communication component, a camera, and a display. The method also includes transmitting the image to the event file at the database if the image comprises a geo-location marker within the geographical location for the specific event and a time stamp within the predetermined period of time. The method also includes accessing through the mobile application of the mobile communication device the event file at the database for the specific event to search a plurality of loaded images for the specific event and engage in event communications if the mobile communication device is within the geographical location for the specific event and within the predetermined period of time.

An additional aspect of the present invention is the ability to have a floating event where the geographic location moves with one or more individuals. Similar to bubbles moving around, members of the event have the event move with them. For example, where people are spending an evening together at a variety of locations, or are on a trip together, where they may separate for periods of time. The idea of the floating bubble would let them invite others to participate on an ad hoc basis during the time that they are together. As an example, when one meets up with friends during a trip and one would like to quickly add them to a vacation group so all the photos one takes during the visit are instantly shared.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
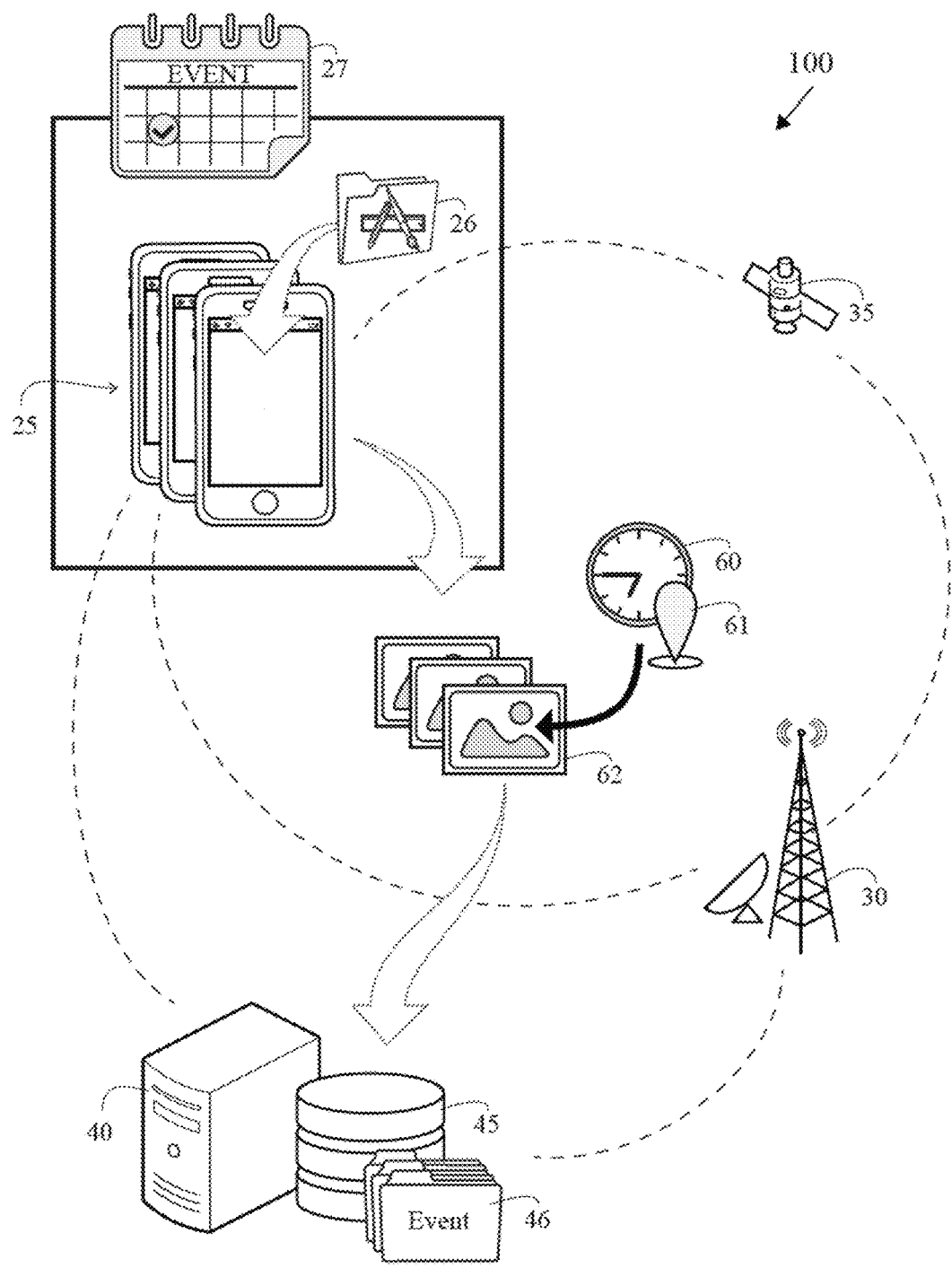
FIG. 1 is an illustration of a system for event based communications between a mobile application and a server.

A system 100 for event based communications between a mobile application and a server is shown in FIG. 1. As shown in FIG. 1, there are several mobile communication devices 25 at an event 27, defined by virtual geographical fence established by geo-locating with GPS satellites 35 or a cellular network 30, and a temporal fence defined by clock mechanism 60. Also shown in the system 100, a server 40 including a database 45 having a plurality of event files 46. Images or other social content 62 from the event are uploaded to the event file 46 for the specific event to be shared with other participants at the event 27. AN application 26 for the event is opened on the mobile communication devices 25 of each of the participants. An event file 46 is established in the database 45 for a specific event 27 at a predetermined period of time 61 and geographical location. Each image 62 loaded on the mobile application 26 of each of the mobile communication devices 25 is transmitted to the event file 46 at the database 40 if the image 62 comprises a geo-location marker within the geographical location for the specific event 27 and a time stamp within the predetermined period of time 61. The mobile application 26 of each of the mobile communication devices 25 is capable of accessing the event file 46 at the database 40 for the specific event 27 to search a plurality of loaded images 62 for the specific event 27 and engage in event communications if the mobile communication device 25 is within the geographical location for the specific event 27 and within the predetermined period of time.

Alternatively, mobile communication devices 25, with Wi-Fi communication enabled, periodically transmit probe requests to locate an access point, even when not associated to a network. A probe request includes the device's radio identifier (MAC address), transmission signal strength (RSSI), and transmission time. A probe request may or may not contain the SSID of a wireless access point.

Figure 2:
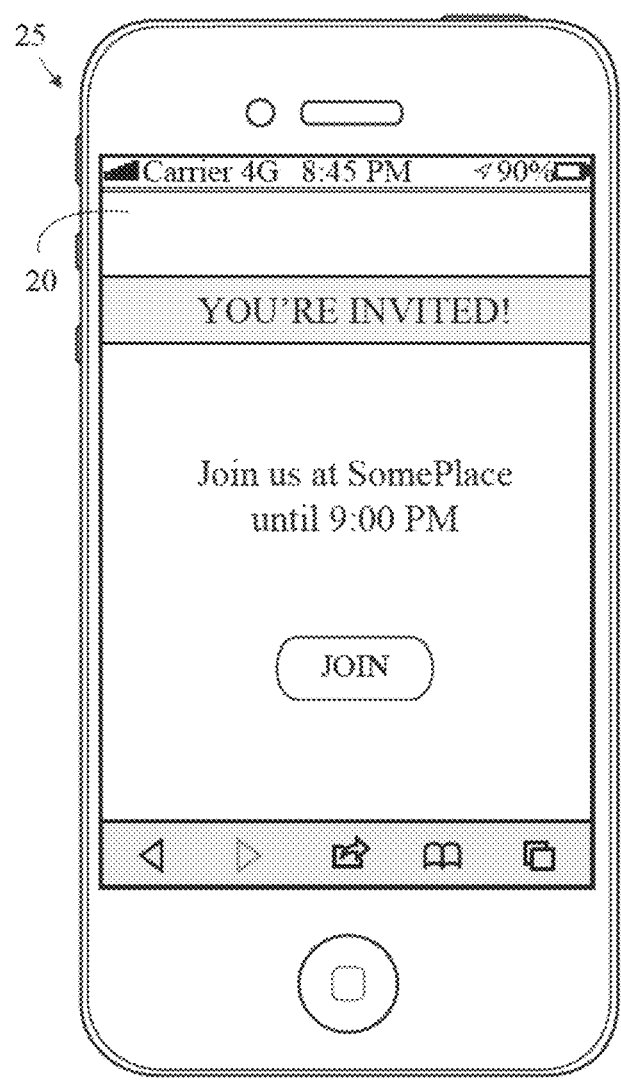
FIG. 2 is an illustration of an invite to an event on a display for a mobile phone.

As shown in FIG. 2, a participant with a mobile communication device having a display shows an invite to the event. The invite might be sent to a specific participant, or might be sent to a mobile communication device 25 having a mobile application that sends an invite if the mobile communication device is within a geographical location at a specific time of an event through a clock mechanism and GPS component of the mobile communication device 25. Further, user might search for events on the mobile application of their mobile communication device 25 using a map with events marked. The map is updated to show events that occur at the time of viewing of the map by user. Alternatively, the map has markers with time indicators for events. Further, the event organizer can limit media and messages to the particular time and geographical location of the specific event, or the event organizer can limit media to the particular time and geographical location of the specific event but allow messages from anyone.

The mobile communication devices 25 utilized with the present invention preferably include mobile phones, smartphones, tablet computers, PDAs and the like. Examples of smartphones and the device vendors include the IPHONE® smartphone from Apple, Inc., the DROID® smartphone from Motorola Mobility Inc., GALAXY S® smartphones from Samsung Electronics Co., Ltd., and many more. Examples of tablet computing devices include the IPAD® tablet from Apple Inc., and the XOOM™ tablet from Motorola Mobility Inc.

A mobile communication service provider (aka phone carrier) of the customer such as VERIZON, AT&T, SPRINT, T-MOBILE, and the like mobile communication service providers, provide the communication network for communication to the mobile communication device of the end user.

Wireless standards include 802.11a, 802.11b, 802.11g, AX.25, 3G, CDPD, CDMA, GSM, GPRS, radio, microwave, laser, Bluetooth, 802.15, 802.16, and IrDA.

Figure 3:
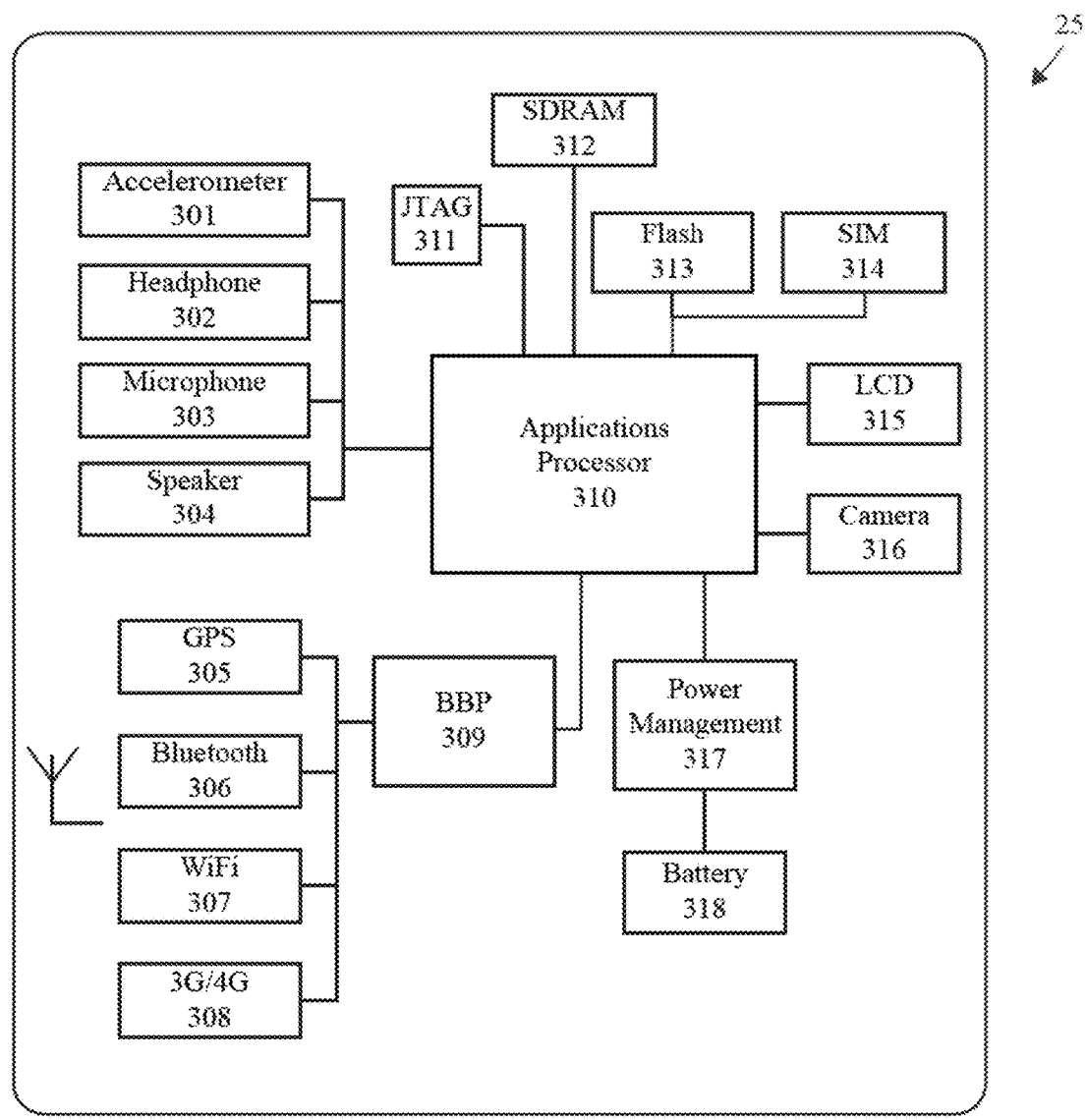
FIG. 3 is a block diagram of components of a preferred embodiment of a mobile communication device.

As shown in FIG. 3, a typical mobile communication device 25 includes an accelerometer 301, a headphone jack 302, a microphone jack 303, a speaker 304, a GPS chipset 305, a Bluetooth component 306, a Wi-Fi component 307, a 3G/4G component 308, a Baseband Processor (for radio control) 309, an applications (or main) processor 310, a JTAG (debugger) 311, a SDRAM memory 312, a Flash memory 313, SIM card 314, LCD display 315, a camera 316, a power management circuit 317 and a battery or power source 318.

Figure 4:
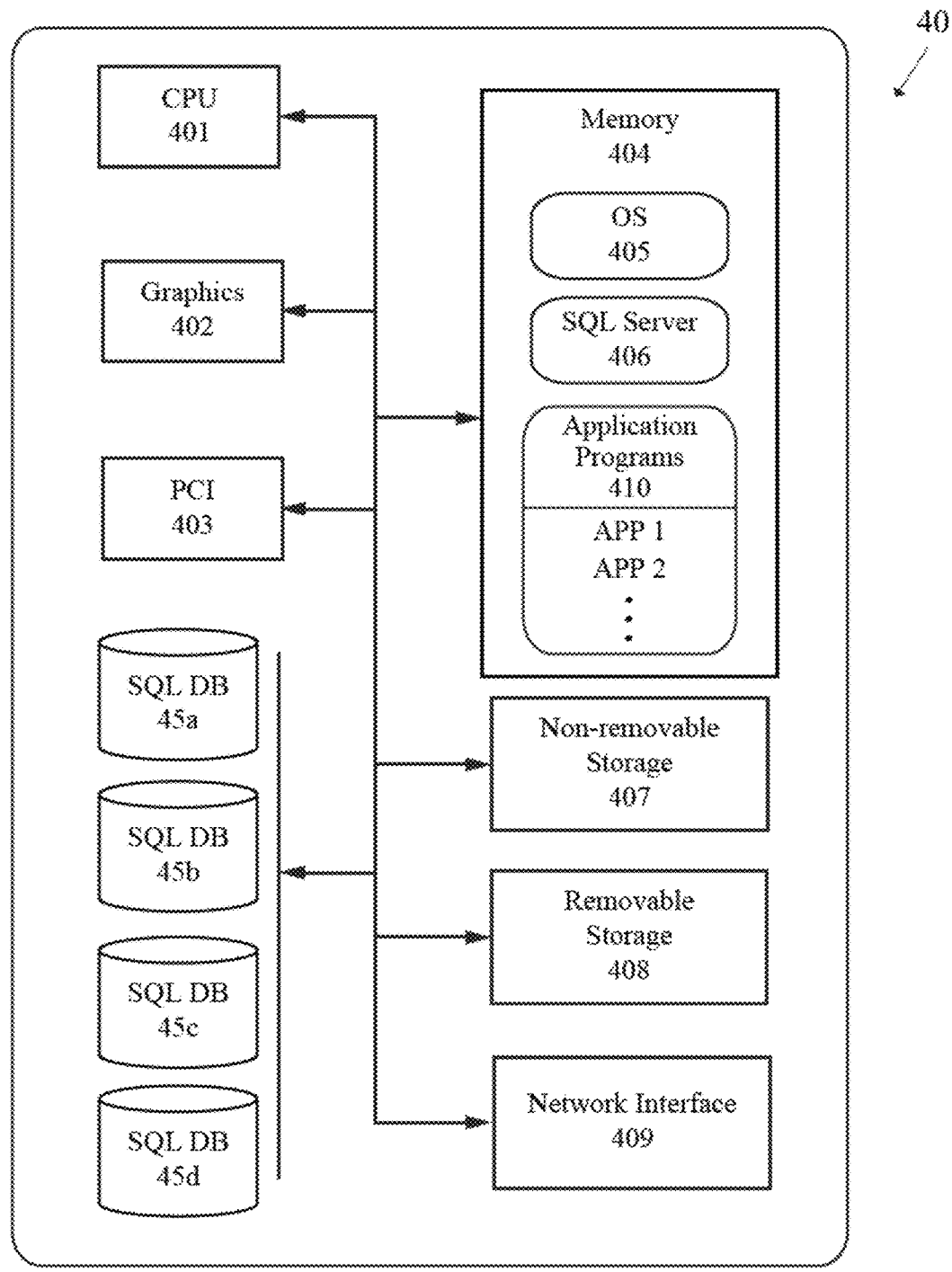
FIG. 4 is a block diagram of components of a preferred embodiment of a data server.

FIG. 4 shows components of a server 40. Components of the server 40 includes a CPU component 401, a graphics component 402, PCI/PCI Express 403, a memory 404, a non-removable storage 407, a removable storage 408, a network interface 409, including one or more connections to a fixed network, and SQL databases 45a-45d. Included in the memory 404, is an operating system 405, a SQL server 406 or other database engine, and application programs/software 410. The server also includes at least one computer program configured to receive data uploads and store the data uploads in the SQL database. Alternatively, the SQL server can be installed in a separate server from the venue server.

The data is preferably transferred to the server 40 using either a cellular network (such as a mobile phone network, e.g., the VERIZON® network) or over the Internet using the WLAN of the venue. The server 40 comprises at least one computer program to receive the data uploads and store the data uploads in a database.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

The event is preferably a fundraiser, a sporting event, a concert, a political rally, a convention, a party, a government meeting, or a building dedication.

Figure 5:
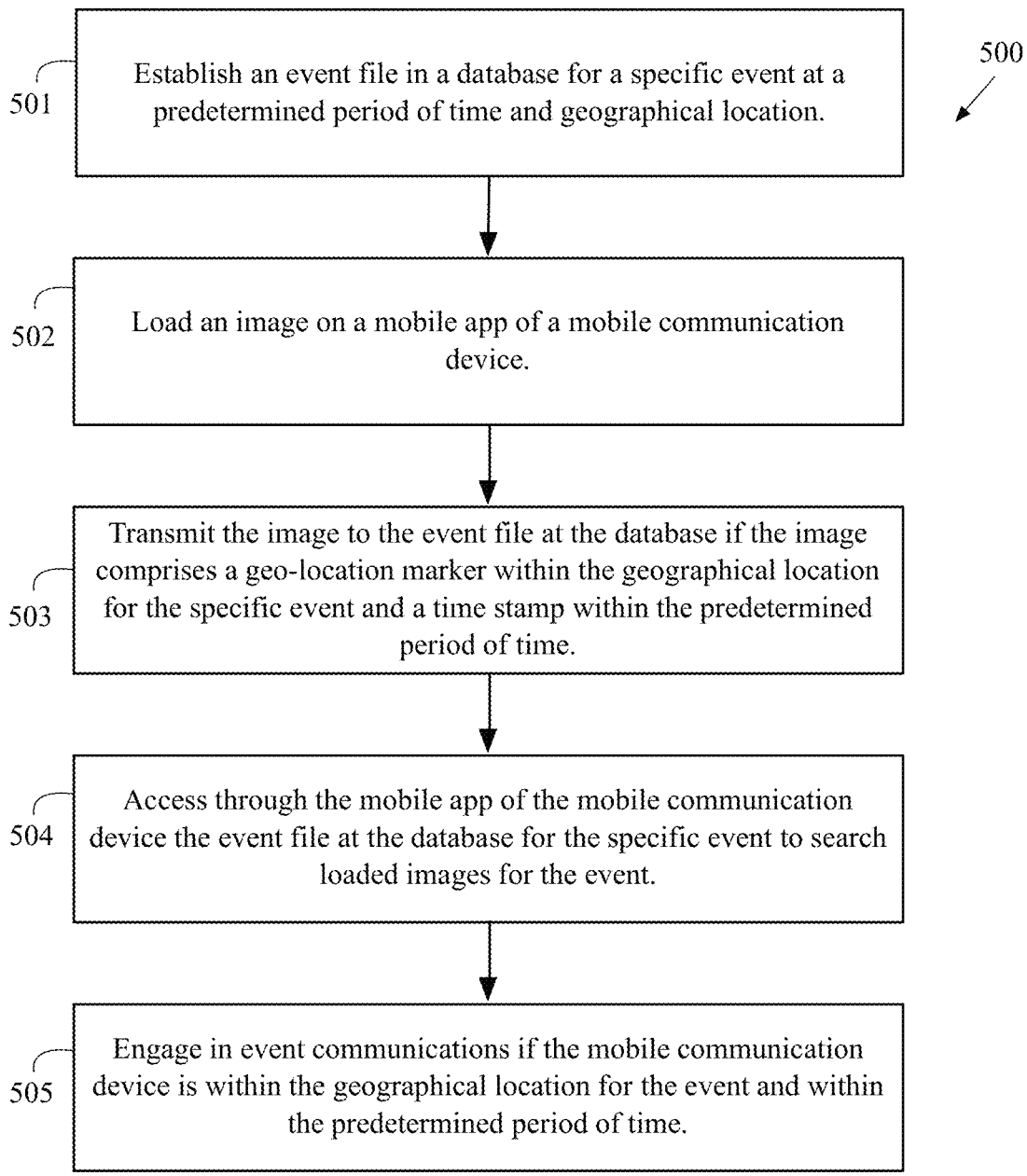
FIG. 5 is a block diagram of a flow chart for a method for an event based communications between a mobile application and a server.

FIG. 5 illustrates a flow chart for a method 500 for an event based communications between a mobile application and a server. At block 501 an event file is established in a database for a specific event at a predetermined period of time and geographical location. At block 502, an image is loaded on a mobile application of a mobile communication device, wherein the mobile communication device comprises the mobile application residing in a memory, a GPS component, WiFi transceiver, a time mechanism, a cellular network communication component, a camera, and a display. At block 503, the image is transmitted to the event file at the database if the image comprises a geo-location marker within the geographical location for the specific event and a time stamp within the predetermined period of time. At block 504, the event file is accessed through the mobile application of the mobile communication device for the specific event to search a plurality of loaded images for the specific event. At block 505, a user engages in event communications if the mobile communication device is within the geographical location for the specific event and within the predetermined period of time.

Figure 6:
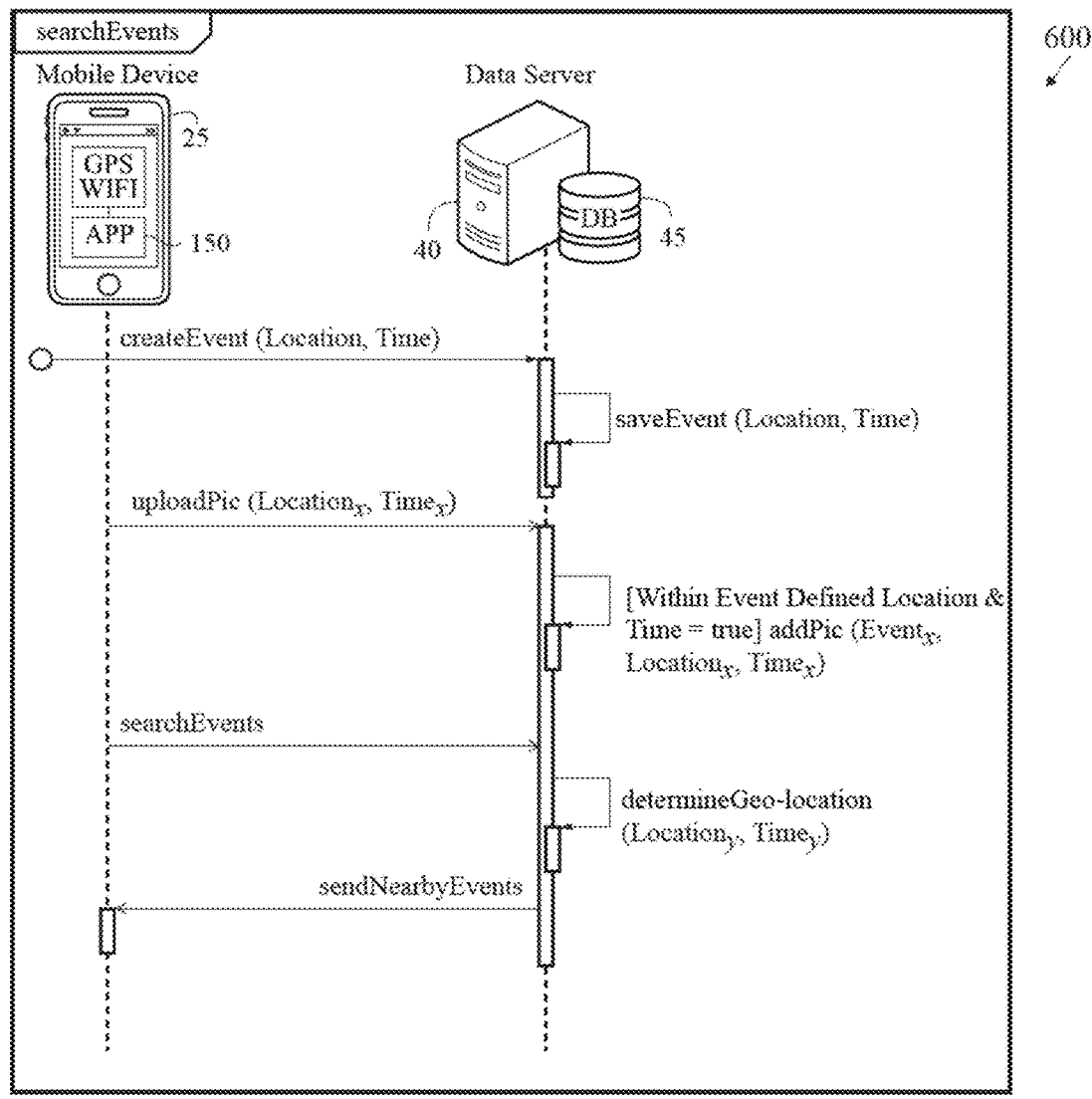
FIG. 6 is a communication sequence diagram for event based communications between a mobile application and a server.

A communication sequence diagram 600 for one embodiment for an event based communications between a mobile application and a server is shown in FIG. 6. The communications are transmitted between the native application 150 of the mobile communication device 25 and a server 40. The native application 150 requests a location update. The mobile communication device 25 receives GPS coordinates from a GPS system 35 through a GPS component 305 of the mobile communication device 25. The mobile communication device 25 determines that the mobile communication device 25 is at the geographical coordinates of a specific event and within a predetermined time period of the specific event. The mobile communication device transmits a signal the native application 150 resident on the mobile communication device that the mobile communication device 25 is within the geographical coordinates of the specific event and within the predetermined time period of the specific event. The native application 150 transmits the geographical location and time coordinates to the server 40 over a network (cellular, WiFi or other), which allows the user of the mobile communication device access to the event file 46 at the database 45. A content (image or other) is transmitted to the event file 46 at the database 45 with a geo-location marker within the geographical location for the specific event and a time stamp within the predetermined period of time. The event file 46 is accessed through the mobile application 150 of the mobile communication device 25 for the specific event to search a plurality of loaded images for the specific event. A user engages in event communications using the mobile communication device 25.

Figure 7:
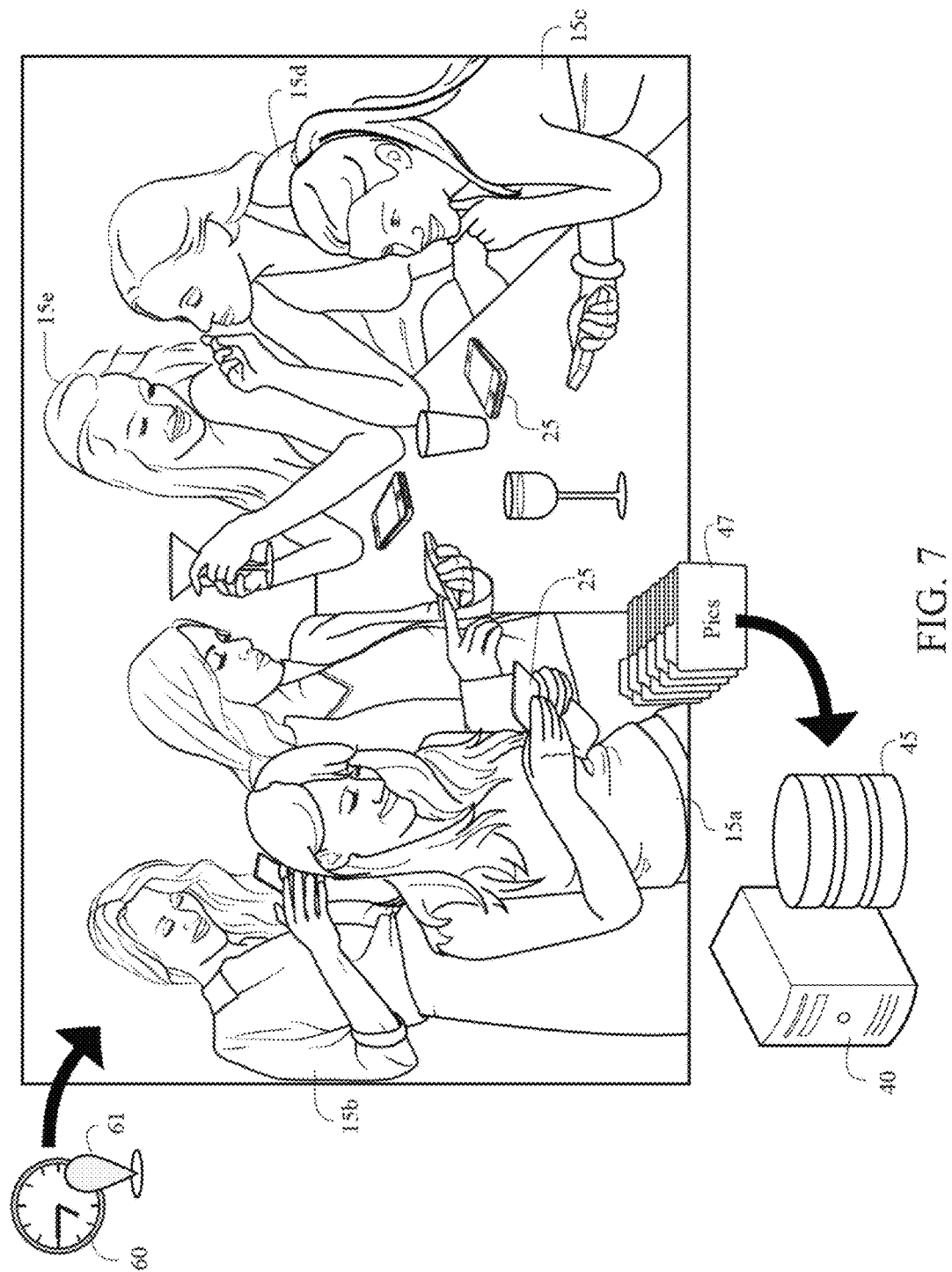
FIG. 7 is an illustration of an event that uses event based communications between a mobile application and a server.

FIG. 7 is an illustration of participants at an event that uses event based communications between a mobile application 150 of a mobile communication device 25 and a server 40. A user previously had established an event file 47 in the database 45 for the specific event at a predetermined period of time and geographical location. Each of the users 15a-15e has a mobile phone 25 with a mobile application thereon. The users have been invited to the specific event or are at the geographical location at the predetermined time. The users take images or upload discussions on the mobile application of each of the mobile phones, which content is then transmitted to the event file 47 at the database 45 with a geo-location marker within the geographical location for the specific event and a time stamp within the predetermined period of time. The mobile application of each of the mobile phones 25 access the event file 47 at the database 45 for the specific event to search loaded images and other content for the specific event and engage in event communications with other users within the geographical location for the specific event and within the predetermined period of time.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. A system for event based communications between a mobile application and a server, the system comprising:
    a server;
    a database;
    a plurality of mobile communication devices, each of the plurality of mobile communication devices comprising a mobile application residing in a memory, a processor, a GPS component, WiFi transceiver, a time mechanism, a cellular network communication component, a camera, and a display;
    wherein an event file is established in the database for a specific event at a predetermined period of time and geographical location;
    wherein each image loaded on the mobile application of each of the mobile communication devices is transmitted to the event file at the database if the image comprises a geo-location marker within the geographical location for the specific event and a time stamp within the predetermined period of time;
    wherein the mobile application of each of the mobile communication devices is capable of accessing the event file at the database for the specific event to search a plurality of loaded images for the specific event and engage in event communications if the mobile communication device is within the geographical location for the specific event and within the predetermined period of time;
    wherein media is limited to the geographical location for the specific event and a time stamp within the predetermined period of time, and messages related to the specific event are open to all mobile communication devices;

wherein the GPS component of the mobile communication device determines a geo-location of the mobile communication device and the processor of the mobile communication device includes the geo-location marker on the image and the processor includes the time stamp on the image from a time generated by the time mechanism of the mobile communication device;

wherein an event organizer established the event file using the mobile application;

wherein the mobile application transmits invitations to a second plurality of mobile communication devices that are not at the specific event.

2. The system according to claim 1 wherein the mobile communication device is a mobile phone or a tablet computer.

3. The system according to claim 1 further comprising a communications network.

4. The system according to claim 1 wherein access to the specific event is by invitation only.

5. The system according to claim 1 wherein the specific event is selected from one of a fundraiser, a sporting event, a concert, a political rally, a convention, a party, a government meeting, and a building dedication.

6. The system according to claim 3 wherein the mobile application of each of the mobile communication devices is in communication with the server over the communication network, and wherein the server is in communication with the database.

7. A method for event based communications between a mobile application and a server, the method comprising:

establishing an event file in a database for a floating based on a geographic location of a mobile communication device of an individual;

loading an image on a mobile application of a mobile communication device, wherein the mobile communication device comprises the mobile application residing in a memory, a GPS component, WiFi transceiver, a time mechanism, a cellular network communication component, a camera, and a display;

transmitting the image to the event file at the database if the image comprises a geo-location marker within the geographical location for the floating event and a time stamp within the predetermined period of time; and accessing through the mobile application of the mobile communication device the event file at the database for the floating event to search a plurality of loaded images for the floating event and engage in event communications if the mobile communication device is within the geographical location for the floating event and within the predetermined period of time;

wherein media is limited to the geographical location for the floating event and a time stamp within the predetermined period of time, and messages related to the floating event are open to all;

wherein the GPS component of the mobile communication device determines a geo-location of the mobile communication device and the processor of the mobile communication device includes the geo-location marker on the image and the processor includes the time stamp on the image from a time generated by the time mechanism of the mobile communication device;

wherein an event organizer established the event file using the mobile application;

wherein the mobile application transmits invitations to a second plurality of mobile communication devices that are not at the floating event.

8. The method according to claim 7 wherein the mobile communication device is a mobile phone or a tablet computer.

9. The method according to claim 7 further comprising searching for a public event using a map displayed on the mobile application.

10. The method according to claim 7 wherein access to the floating event is by invitation only.

11. The method according to claim 9 wherein the mobile application of the mobile communication device is in communication with the server over the communication network, and wherein the server is in communication with the database.

12. The method according to claim 7 further comprising sharing media related to the floating event from the event file of the database to a plurality of mobile communication devices having the mobile application, wherein the media comprises at least one of video, images and messages.

* * * * *